United States Patent
Cok et al.

(10) Patent No.: US 7,197,218 B2
(45) Date of Patent: Mar. 27, 2007

(54) LIGHT PIPE WITH MOLDED OPTICAL SURFACES

(75) Inventors: Ronald S. Cok, Rochester, NY (US); John N. Border, Walworth, NY (US)

(73) Assignee: Eastman Kodak Company, Rochester, NY (US)

( * ) Notice: Subject to any disclaimer, the term of this patent is extended or adjusted under 35 U.S.C. 154(b) by 107 days.

(21) Appl. No.: 10/815,013

(22) Filed: Mar. 31, 2004

(65) Prior Publication Data
US 2005/0218537 A1 Oct. 6, 2005

(51) Int. Cl.
G02B 6/04 (2006.01)
G02B 6/00 (2006.01)
G02B 6/36 (2006.01)
A41F 1/00 (2006.01)
A61M 1/00 (2006.01)
F21V 5/00 (2006.01)
F21V 17/00 (2006.01)

(52) U.S. Cl. .................... 385/120; 385/121; 385/901; 362/554; 362/556; 362/576; 362/581; 362/582; 362/610; 362/615

(58) Field of Classification Search ........ 385/120–121; 362/581
See application file for complete search history.

(56) References Cited

U.S. PATENT DOCUMENTS

| | | |
|---|---|---|
| 3,033,731 A | 5/1962 | Cole |
| 3,989,578 A | 11/1976 | Hashimoto |
| 5,204,927 A | 4/1993 | Chin et al. |
| 5,376,201 A | 12/1994 | Kingstone |
| 5,465,315 A | 11/1995 | Sakai et al. |
| 5,572,034 A | 11/1996 | Karellas |
| 5,615,294 A | 3/1997 | Castonguay |
| 5,657,408 A * | 8/1997 | Ferm et al. .................. 385/43 |

(Continued)

FOREIGN PATENT DOCUMENTS

WO 02/39155 5/2002

OTHER PUBLICATIONS

U.S. Appl. No. 10/815,012; filed Mar. 31, 2004; titled "Light Pipe With ALignment STructures"; of Ronald S. Cok et al.

Primary Examiner—Frank G. Font
Assistant Examiner—Ryan Lepisto
(74) Attorney, Agent, or Firm—Andrew J. Anderson

(57) ABSTRACT

A method of manufacturing a light-conductive pipe is described comprising the steps of: forming a light pipe mold having an elongated cavity with two optical end faces and an opening for injecting molten material into the cavity distant from either optical end face; providing molten material from a supply of molten material; injecting the molten material through the opening; and cooling and solidifying the molten material to form a light-conductive pipe having an input optical face and an output optical face connected by an elongated body of light-conductive material. Also described are injection molded light-pipes formed by the method, and integrated linear arrays of injection molded light-conductive pipes formed by the method. Optical faceplates may be formed comprising multiple stacked integrated linear arrays of injection molded light-conductive pipes formed by the method, and tiled flat-panel display systems may comprise a plurality of modules aligned in an array, each module comprising a flat-panel display having a plurality of pixels and such an optical faceplate.

16 Claims, 6 Drawing Sheets

U.S. PATENT DOCUMENTS

| | | |
|---|---|---|
| 5,938,812 A | 8/1999 | Hilton, Sr. |
| 6,195,016 B1 | 2/2001 | Shankle et al. |
| 6,304,703 B1 * | 10/2001 | Lowry ....................... 385/120 |
| 6,418,254 B1 | 7/2002 | Shikata et al. |
| 6,441,077 B1 * | 8/2002 | Border et al. ............... 524/433 |
| 2002/0168157 A1 | 11/2002 | Walker et al. |

* cited by examiner

LIGHT PIPE WITH MOLDED OPTICAL SURFACES

FIELD OF THE INVENTION

This invention generally relates to a method for manufacturing light pipes and, more particularly, to a method for injection molding arrays of such light pipes to form a faceplate.

BACKGROUND OF THE INVENTION

One advantage of electronic display systems is the capability to display an image in a variety of formats and sizes. There is particular interest in providing large-scale displays, visible to thousands of viewers over considerable distance, such as would be useful for entertainment and advertising. One known method for providing large-scale electronic displays is tiling, in which a matrix of smaller displays are linked together to form a larger display surface.

Image-forming devices such as LCDs, matrixed LEDs, Organic Light Emitting Diodes (OLEDs), and Polymer Light Emitting Diodes (PLEDs) provide a two dimensional image in pixel form, with pixels familiarly arranged in rows and columns. A recognized problem for displays using these components relates to inherent dimensional limitations of the electronic image-forming components themselves. Size and packaging requirements for these devices constrain their use in large-scale display applications, requiring special methods and techniques for image enlargement and tiling.

Optical converters, typically comprising arrays of optical fibers or light pipes, have been recognized as a means for enlarging an electronically generated image in order to display the image in a larger format, such as for tiling applications. For example, U.S. Pat. No. 6,195,016 entitled Fiber Optic Display System with Enhanced Light Efficiency, filed Feb. 27, 2001, by Shankle et al. discloses an enlarged display using images provided from conventional transparencies, visibly enlarged by means of fiber optic light guides, each fiber painstakingly routed from the image forming device to a display panel. Similarly U.S. Pat. No. 6,418,254 entitled Fiber-Optic Display, filed Jul. 9, 2002, by Shikata et al. discloses a fiber optic display coupled with an image projector. U.S. Pat. No. 6,304,703 entitled Tiled Fiber Optic Display Apparatus, filed Oct. 16, 2001, by Lowry discloses a tiling implementation using bundles of optical fibers routed from image-forming components to a display apparatus.

As an alternative to routing individual fibers, symmetrically fixed groupings of optical fibers are preferred. For example, U.S. Pat. No. 5,465,315 entitled Display Apparatus Having A Plurality of Display Devices filed Nov. 7, 1995 by Sakai et al. discloses a tiled display employing LCD devices, with images tiled on a display surface using a fiber optic faceplate. Fiber optic faceplates have also been disclosed for use in a number of other applications, such as U.S. Pat. No. 5,572,034 entitled Fiber Optic Plates For Generating Seamless Images, filed Nov. 5, 1996 by Karellas which discloses tiling using fiber optic faceplates in an X-ray imaging apparatus and U.S. Pat. No. 5,615,294 entitled Apparatus For Collecting Light and It's Method of Manufacture, filed Mar. 25, 1997 by Castonguay which discloses use of a tapered fiber optic faceplate in light-sensing instrumentation.

Fiber optic faceplates that are commercially available are well suited for many types of image-sensing and instrumentation purposes. However, the overall requirements for using fiber optic faceplates for electronic image display are more demanding, particularly when used with LCD, LED, OLED, or PLED devices. In such a case, it is important to have precise positioning of optical fibers at the input and output sides of a fiber optic faceplate. That is, each pixel or group of pixels at the image-forming device has a corresponding fiber light guide within the fiber optic faceplate that directs light from that pixel or pixels to the output display surface. This requirement necessitates custom design of a fiber optic faceplate for the geometry of the image forming device itself (such as for an OLED, for example) and for the geometry of the display surface. It can be appreciated that tiling arrangements introduce even more complexity into the faceplate fabrication problem. As a result, fiber optic faceplates suitable for electronic image display continue to be costly and difficult to fabricate. Solutions for fiber optic faceplate fabrication, such as those disclosed in International Application WO 02/39155 (Cryan et al.) can be highly dependent on accurate dimensions of the optical fiber or of interstitial fillers used to provide a precise spacing between fibers. Moreover, the faces of the faceplates require optical polishing to provide a suitable face of high optical quality.

One prior art approach for providing accurate positioning of optical fibers in a fiber bundle is disclosed in U.S. Pat. No. 3,989,578 entitled Apparatus For Manufacturing Optical Fiber Bundle, filed Nov. 2, 1976, by Hashimoto, hereinafter termed the '578 patent. In the method of the '578 patent, directed to the manufacture of fiberscope apparatus, optical fiber is wound around a mandrel and aligned in guide frames to obtain precise positioning. In U.S. Pat. No. 5,938,812 entitled Method for Constructing A Coherent Imaging Bundle, filed Aug. 17, 1999 by Hilton, Sr., hereinafter termed the '812 patent, a multilayer fiber optic bundle is fabricated by winding a fiber optic strand around a drum, within a plastic channel. In U.S. Pat. No. 3,033,731 entitled Method For The Manufacture Of Optical Image-Transfer Devices, filed Mar. 6, 1958, by Cole, hereinafter termed the '731 patent, fiber is wound about a mandrel to form rows, which can then be combined to build up a fiber structure. Thus, it can be seen that a drum or mandrel, properly dimensioned, can be a suitable apparatus for positional arrangement of optical fibers in a bundle. However, neither the '578, '812, nor '731 patents provide a suitable solution for optical fiber faceplate fabrication. The methods used in the above-mentioned patents position fibers adjacently, so that the dimensions of the fiber itself determine center-to-center spacing of the fiber bundle. However, such methods are highly dependent on the uniformity of fiber dimensions. In actual practice, however, the actual dimensions of optical fiber can vary widely, even for the same type of fiber. Additional tolerance error is due to winding tension differences as the fiber strands are wound about the drum. More significantly, however, the methods of the '578, '812, and '731 patents do not provide a way to vary the center-to-center distances between fibers, both at input and at output ends of the fiber bundle. As is noted earlier, the capability for varying the center-to-center distance between fibers, lacking with the methods of the '578, '812, and '731 patents, is of paramount importance for display imaging applications. Moreover, the fibers, once cut and formed into a faceplate, require optical polishing to improve their optical characteristics.

In an attempt to meet the requirements for variable center-to-center spacing, U.S. Pat. No. 5,204,927 (Chin et al.), hereinafter termed the '927 patent, discloses the use of pairs of axially disposed spacer bars. The use of spacer bars allows a fiber optic bundle to have different fiber spacing at input and output ends. Similarly, U.S. Pat. No. 5,376,201 entitled Method of Manufacturing An Image Magnification Device, filed Dec. 27, 1994, by Kingstone hereinafter termed the '201 patent, discloses the use of spacer guides in a rotating drum application for output fiber spacing, where the output spacer guides, added as each layer of fiber is formed, become part of the completed fiber bundle assembly.

While the '927 and '201 disclosures suggest helpful fabrication techniques for fiber optic couplers, there is felt to be considerable room for improvement. In particular, neither the '927 nor the '201 disclosure are well suited to the requirements for accurate, high-speed, and inexpensive fabrication of fiber optic faceplates as the type of optical converter needed for electronic display imaging. With respect to both '927 and '201 disclosures, curvature effects of the rotating drum constrain the attainable size of a fiber optic faceplate built up in this way. Continuous feeding of optical fiber is necessary, which suggests a substantial amount of waste with the '927 and '201 methods. The method of the '201 disclosure relies heavily on precision manufacture of grooved spacer components, incorporated into the body of the fiber faceplate itself, used to define the spacing of each output row and to set the spacing between rows. Moreover, new spacers are required to be accurately positioned as each row of fibers is wound. This adds cost and complexity to the fabrication process.

U.S. Patent Application Publication 2002/0168157 (Walker et al.) discloses a method for fabrication of a fiber optic faceplate made from stacked sheets of optical fibers, where the sheets are formed using co-extrusion of fiber optic material through a specially designed die. These flat sheet structures can be stacked and bonded together, either using heat or some other means, to form a composite structure, which can be up to a few meters in length, comprising parallel lengths of optical fiber that extend down the length of the composite structure. This composite structure is then cross-sectioned to obtain individual fiber optic faceplates of a selectable thickness. Although this method provides some advantages for mass manufacture of fiber optic faceplates, significant drawbacks remain. For example, the extrusion method of the Publication 2002/0168157 disclosure (the '157 disclosure) maintains a consistent spacing between optical fibers as they are formed; this method is not designed to allow varying the spacing between optical fibers at different points along their lengths. The optical fibers in the faceplate obtained with this method have the same center-to-center spacing throughout the structure. In order to obtain different effective center-to-center spacing for a fiber optic faceplate, input side to output side, the method of the '157 disclosure requires sectioning the composite structure of bonded fibers at an oblique angle. This rigidly constrains the number of possible center-to-center spacing arrangements that can be obtained from any one production run. Using the method of the '157 disclosure has further disadvantages with respect to sizing constraints. The maximum dimensions of a fiber optic faceplate using '157 disclosure techniques is rigidly determined by the width of an extrusion die; obtaining a larger width structure requires building a larger extrusion die and scaling up the supporting mechanical subsystems, at costs which could easily be prohibitive. Spacing between stacked sheets, in a direction orthogonal to the row direction, is not easily varied using the methods of the '157 disclosure, limiting the range of spacing dimensions that can be obtained. Cross-sectional diameters of the component optical fibers cannot be reliably varied from the input side of the fiber optic faceplate to the output side. As with the other designs cited, such manufacturing processes require expensive optical finishing of the fiber surfaces.

As the above examples illustrate, conventional methods for forming optical converters such as fiber optic faceplates are based on various techniques such as assembling individual optical fibers into a faceplate structure, characteristically using winding or stitching operations or extruding rows of optical fibers into sheets for stacking, bonding, cross-sectioning, and polishing. Given the difficulties, costs and limitations inherent when using optical fibers as light guides, it can be appreciated that alternative methods for providing an optical converter at reduced cost and having added flexibility would be beneficial.

Overall, it can be seen that there is a need for improved methods for fabrication of optical converters, particularly for electronic imaging applications.

SUMMARY OF THE INVENTION

In accordance with a first embodiment of the invention, a method of manufacturing a light-conductive pipe is described comprising the steps of:

a.) forming a light pipe mold having an elongated cavity with two optical end faces and an opening for injecting molten material into the cavity distant from either optical end face;

b.) providing molten material from a supply of molten material;

c.) injecting the molten material through the opening; and d.) cooling and solidifying the molten material to form a light-conductive pipe having an input optical face and an output optical face connected by an elongated body of light-conductive material.

In accordance with further embodiments, the invention is directed towards injection molded light-pipes comprising an input optical face and an output optical face connected by an elongated body of light-conductive material formed by the method, and to integrated linear arrays of injection molded light-conductive pipes, where each pipe comprises an input optical face and an output optical face connected by an elongated body of light-conductive material, where the pipes in the linear array are connected by alignment features and are formed by the method. In accordance with yet further embodiments, the invention is directed towards an optical faceplate comprising multiple stacked integrated linear arrays of injection molded light-conductive pipes formed by the method, and to tiled flat-panel display systems comprising a plurality of modules aligned in an array, each module comprising a flat-panel display having a plurality of pixels and such an optical faceplate.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Figure 1:
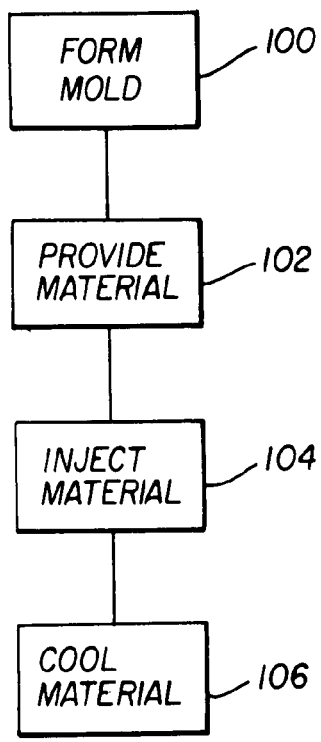
FIG. 1 shows flow diagram according to one embodiment of the method of the present invention.

Referring to FIG. 1, a method of manufacturing a light-conductive pipe comprises the steps of: forming 100 a light-pipe mold having an elongated cavity with two optical end faces and an opening for injecting molten material into the cavity distant from either optical end face; providing 102 molten material from a supply of molten material; injecting 104 the molten material through the opening; and cooling 106 and solidifying the molten material to form a light-pipe having an input optical face and an output optical face connected by an elongated body of light-conductive material. For the purpose of the invention, an elongated cavity is intended to define a cavity having a length that is greater than a characteristic diameter of the two optical end faces. Typically, the cavity length will be at least twice the diameter of the end faces, more typically at least ten times the diameter of the end faces.

Figure 2:
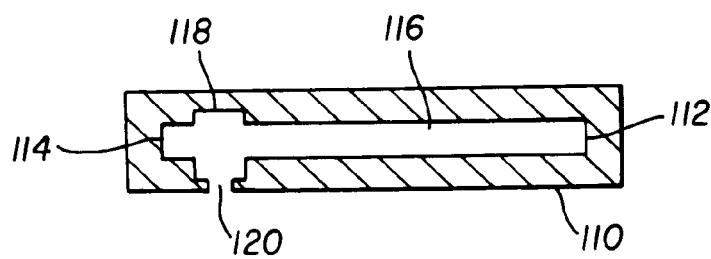
FIG. 2 shows a schematic side view of a mold for making light pipes according to an embodiment of the method of the present invention.

Referring to FIG. 2, the mold 110 includes a cavity 116 for the body of the light pipe having two polished optical faces 112 and 114 at opposite antis of the mold, Cavity 116 and may include cavity contours such as one or more flanges 118 that form at least one integral light pipe alignment feature projecting from the elongated body of the light pipe and which may be used to connect and align light pipes. An opening 120 is provided to inject molten material into the cavity 116 at a point distant from either optical end face. The opening for injecting molten material into the cavity is preferably located in the alignment feature cavity contour flange 118. Alignment feature cavity contours may also allow the molten material to flow between multiple cavities 116 when an array of light pipes are molded together. Light pipes formed with alignment features may be aligned and stacked in one and two dimensional arrays as described in concurrently filed, commonly assigned, copending U.S. Ser. No. 10/815,012, the disclosure of which is incorporated by reference herein.

Figure 3:
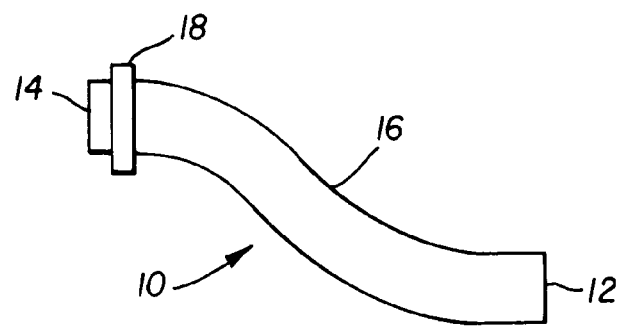
FIG. 3 shows a schematic side view of a light pipe made according to an embodiment of the method of the present invention.

Although the cavity is shown as straight, it may be bent in any dimension to provide a curved light pipe as shown in FIG. 3. Referring to FIG. 3, a single light pipe 10 is shown that may be manufactured according to the method of the present invention. The light pipe 10 has optical faces 12 and 14 connected by an elongated light conducting body 16 and an alignment feature 18.

Figure 4:
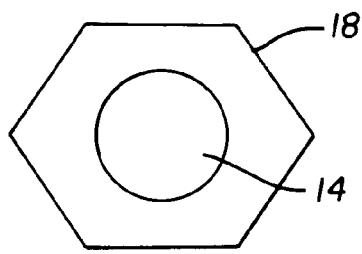
FIG. 4 shows a schematic end view of a light pipe made according to the method of the present invention.
Figure 5:
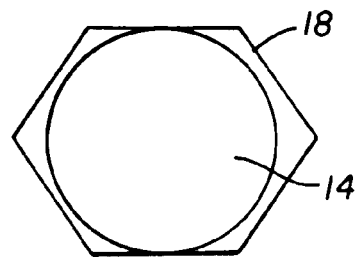
FIG. 5 shows a schematic end view of an alternative light pipe made according to the method of the present invention.
Figure 6:
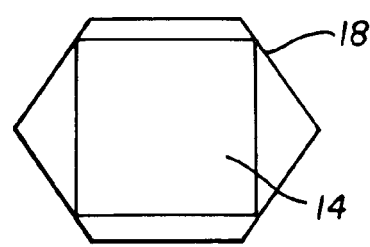
FIG. 6 shows a schematic end view of another alternative light pipe made according to the method of the present invention.
Figure 7:
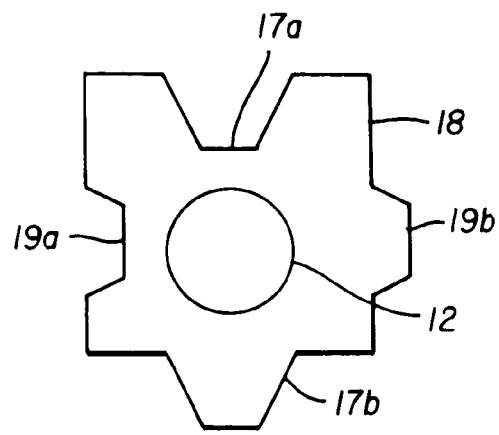
FIG. 7 shows a schematic end view of yet another alternative light pipe made according to the method of the present invention.

The alignment feature 18 and the shape of the light pipe 10 may take a variety of forms. Referring to FIG. 4, a single circular cross-section light pipe with an optical face 14 has a hexagonal alignment feature 18. Referring to FIG. 5, a single circular optical face 14 larger than that of FIG. 4 is shown with a similar hexagonal alignment feature 18. Referring to FIG. 6, a single light pipe with a rectangular cross sectional optical face 14 and a hexagonal alignment feature 18, is illustrated. Referring to FIG. 7, a single light pipe with a circular optical face 12 has an alignment feature 18 with indentations 17a and 19a and matching protrusions 17b and 19b respectively to aid alignment.

Figure 8:
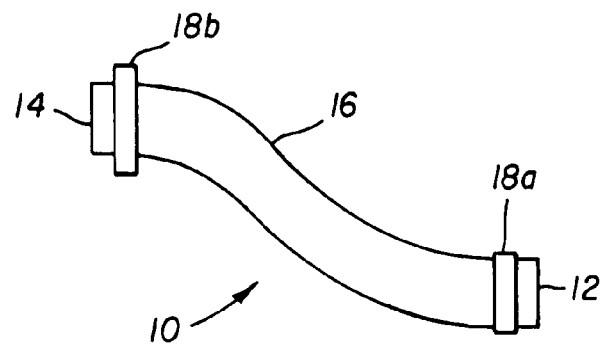
FIG. 8 shows a schematic side view of an alternative light pipe made according to an embodiment of the method of the present invention.
Figure 9:
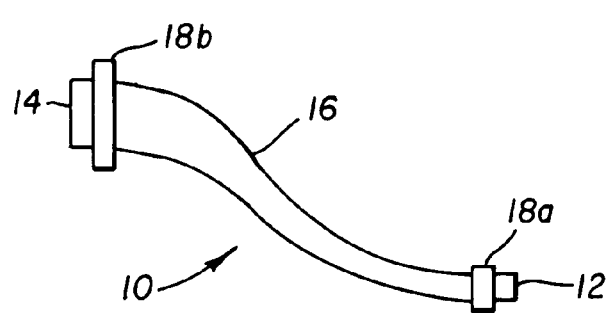
FIG. 9 shows a schematic side view of another alternative light pipe made according to an embodiment of the method of the present invention.

A light pipe 10 may have more than one alignment feature 18. Likewise, more than one opening 120 separate from the optical faces 112 and 114 for injecting molten material may be provided in mold 110. The alignment features 18 may have different sizes or the light pipe 10 may have a variable size along its length. Referring to FIG. 8, a light pipe having different size alignment features 18a and 18b is illustrated. Referring to FIG. 9, a light pipe 10 having a variable size and having different size alignment features 18a and 18b is shown.

Figure 10:
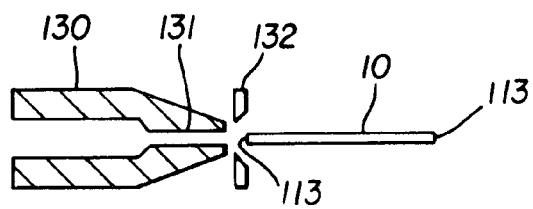
FIG. 10 shows a schematic side view of an extrusion mold and light pipe according to a prior art method.

In order to more clearly contrast the present invention with the prior art, FIG. 10 illustrates the basic extrusion process used for extruding fiber optics or light pipes. Referring to FIG. 10, an extrusion device 130 extrudes molten material under pressure through a die 131 to form a continuous strand of light pipe 10. When the strand is of a suitable length, it is cut by cutters 132 leaving ends 113 This cutting action does not leave an optically useful surface on either end 113 of the light pipe. Hence, the light pipe 10 must be polished on both ends.

Figure 11:
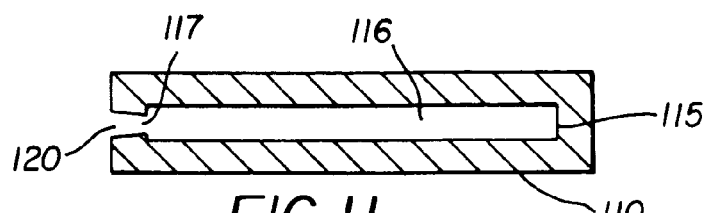
FIG. 11 shows a schematic side view of an injection mold and light pipe according to a prior art method.

In an alternative prior art method illustrated in FIG. 11, a mold 110 includes a cavity 116 with unpolished faces 115 and 117. An opening 120 is provided at one end of the mold. Material is forced into the mold and cooled to form a light pipe. When the light pipe is removed from the mold, at least the one face 117 through which the molten material is forced must be optically polished. It should also be noted that neither of the prior-art light pipes shown as manufactured in FIGS. 10 and 11 have any provision for aligning multiple light pipes relative to one another as when a plurality of light pipes is assembled into a face plate. In an alternative embodiment of the present invention when an array of light pipes is molded off a runner, the cooled light pipes may be disconnected from the runner by snapping or cracking the thin connective piece of material formed in the opening 120. In a second alternative when a plurality of light pipes is molded off a hot runner, the light pipes can be removed directly from the hot runner in the mold. Because the present invention uses an opening 120 separate from the optical faces 112 and 114, any imperfection produced in the contour surface of the flange feature 118 may still produce acceptable optical performance of the resulting light pipe.

It is anticipated that the light pipes made according to the method of the present invention will be used in arrays formed of stacked rows of light pipes. Hence, having a simple, easily manufactured means of aligning a plurality of light pipes is useful. Because the quality of the surface in the faces 12 and 14 and body 16 of the light pipe 10 is critical to the optical performance of the device, it is preferred to provide mold opening 120 in flange feature 118.

Figure 12:
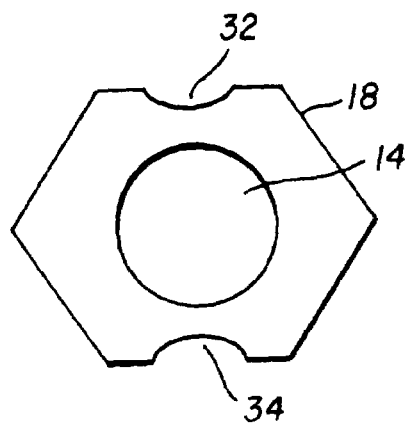
FIG. 12 shows a schematic end view of yet another alternative light pipe made according to the method of the present invention.
Figure 13:
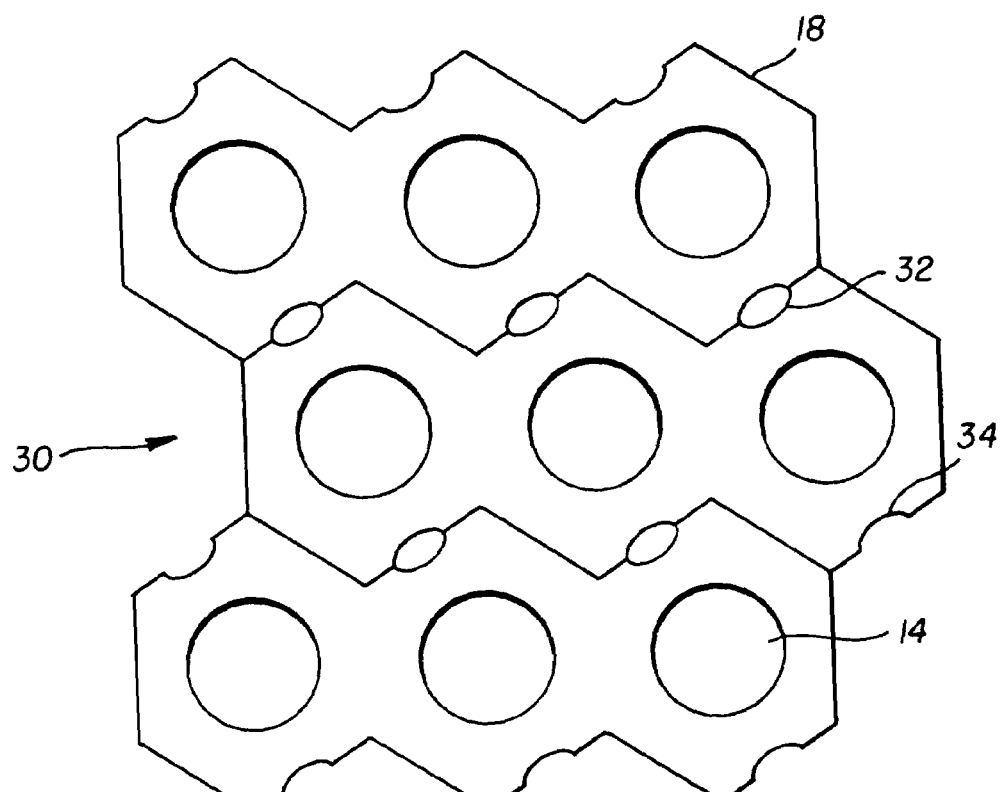
FIG. 13 shows a schematic top view of an array of light pipes made according to an embodiment of the present invention.

In a preferred embodiment shown in FIG. 12, the alignment feature 18 may include an indentation that is not in contact with other aligning features. Indentation 32 is provided in alignment feature 18. This indentation 32 may have the opening 120 through which molten material passes to form the light pipe 10. When the light pipe 10 is snapped away from the runner in the opening 120, any imperfection will be located in the indentation and will not affect either the alignment of the light pipe or the optical performance of the light pipe. In a further embodiment, an additional indentation 34 may be provided in a complementary location to further enhance the likelihood that any material left behind after snapping any unneeded material away from the light pipe does not deleteriously affect the alignment or optical performance of the light pipe. Referring to FIG. 13, a plurality of light pipes having indentations 32 and 34 in alignment feature 18 similar to the individual light pipe of FIG. 12 are molded into integral linear arrays where the pipes in the linear array are connected by alignment features, and multiple integrated linear arrays are aligned into stacked rows to form an optical faceplate 30.

As used in this description, an optical face or an optically polished surface means that the molded surface of the material is of sufficiently high quality that further cutting and polishing is optional. This reduces manufacturing costs. Likewise, snapping the light pipe(s) from the connective material rather than cutting them away, reduces manufacturing costs.

Figure 14:
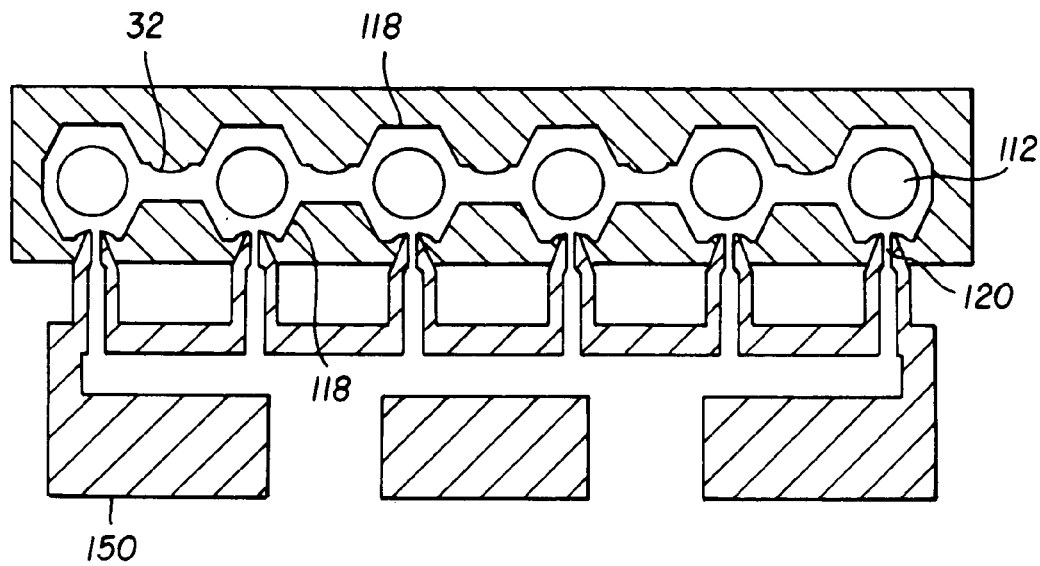
FIG. 14 shows a cross section view of an injection mold and row of light pipes made according to an embodiment of the present invention.
Figure 15:
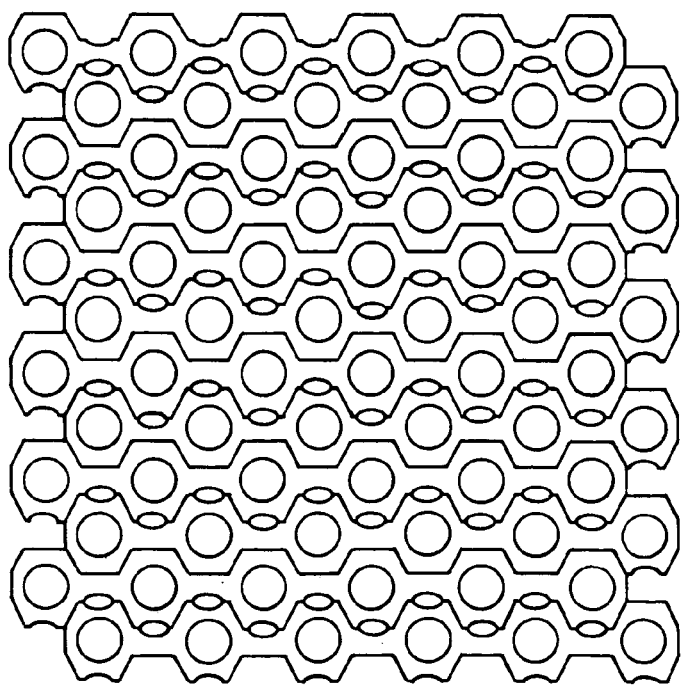
FIG. 15 shows a schematic top view of an array of rows of light pipes of FIG. 14.
Figure 16:
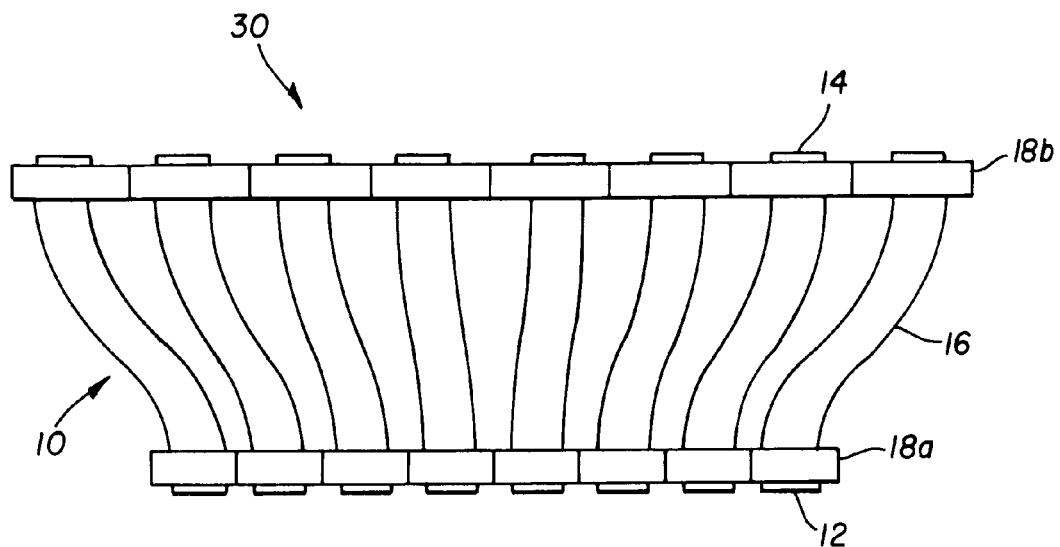
FIG. 16 shows a schematic side view of a row of light pipes having smaller alignment features and larger alignment features according to an embodiment of the present invention.

The light pipes made according to the method of the present invention may be made individually. Alternatively, referring to FIG. 14, a mold 110 for forming an array of light pipes having flange features 118, openings 120, and optical faces 112 is shown in cross-section. The mold 110 is shown with a hot runner 150 and individual gate openings 120 going to each flange feature 118. However, it should recognized from FIGS. 14 and 16 that the alignment flange 118 extends between individual light pipe mold cavities so that a single opening 120 could be used to supply plastic to more than one light pipe mold cavity with the plastic flowing between light pipe mold cavities through the alignment flange 118. Given a plurality of the light-pipe arrays as shown in FIG. 14, the arrays may be stacked and assembled into a faceplate as shown in FIG. 15. Referring to FIG. 16, a side view of a row of light pipes made according to the method of the present invention is shown. In FIG. 16, the alignment features 18a of one side of the light pipe array is smaller than the alignment features 18b of the other side.

Figure 17:
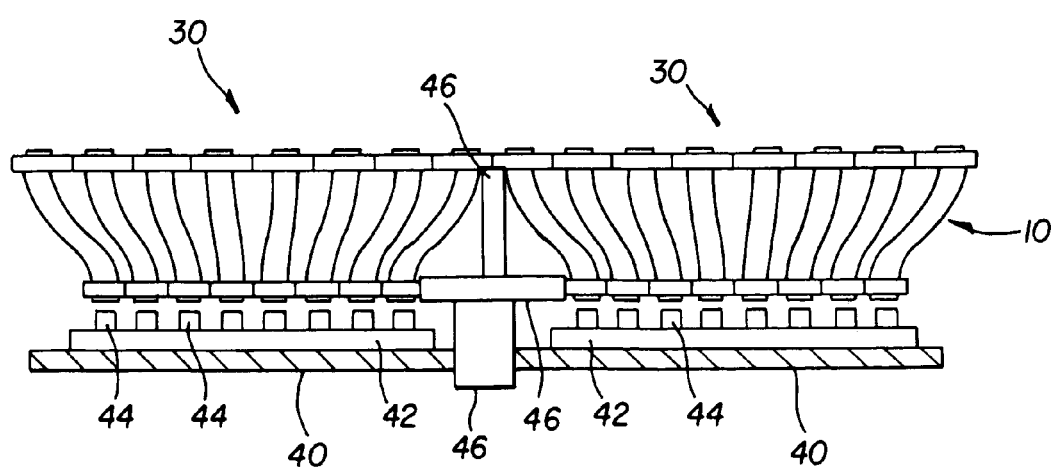
FIG. 17 shows a schematic side view of two aligned faceplates with flat-panel displays according to an embodiment of method of the present invention.

Referring to FIG. 17, faceplates 30 made according to the method of the present invention may used in a tiled flat-panel display system comprising a plurality of modules aligned in an array, each module comprising a flat-panel display having a plurality of pixels and an optical faceplate 30. Each light pipe 10 may be aligned with one or more pixels 44 of a flat-panel display 42 mounted on a printed circuit board 40 to form a large-format, tiled, flat-panel display. The modules may be aligned in the tiled system using supports 46.

The light pipes made in accordance with the present invention are manufactured by injection molding. Suitable molding machines are known and capable of providing the necessary precision. Suitable materials for the light pipes include polycarbonates, acrylics including polymethylmethacrylates, fluoropolymers, cyclic olefins, polysulfones, polyethersulfones, polyetherimides, and optical nanocomposite type derivatives of the afore mentioned transparent plastics that have been modified with inorganic materials to improve the optical properties of the plastics such as higher refractive index or lower chromatic dispersion. Flat-panel displays, such as liquid crystal displays or organic light emitting diode (OLED) displays are commercially available. System and display controllers may be made using conventional integrated circuit technology. Conventional mounting and interconnection means may be used to provide signal, power, and control capabilities.

The method of the present invention provides an advantage in that it provides a low-cost method for forming light pipes having optical faces and optically conductive bodies, and optionally having self-alignment features. The light pipes can be molded singly or in a connected plurality of light pipes.

The invention has been described in detail with particular reference to certain preferred embodiments thereof, but it will be understood that variations and modifications can be effected within the spirit and scope of the invention.

PARTS LIST 10 light pipe
12 optical face
14 optical face
16 body
17a indentation
17b protrusion
18 alignment feature
18a alignment feature
18b alignment feature
19a indentation
19b protrusion
30 faceplate
32 indentation
34 indentation
40 printed circuit board
42 flat-panel display
44 pixel(s)
46 support
100 form mold step
102 provide material step
104 inject material step
106 cool material step
110 mold
112 mold optical face
113 end
114 mold optical face
115 mold face
116 mold cavity
117 mold face
118 flange feature
120 opening
130 extruder
131 extrusion die
132 cutters
150 hot runner

What is claimed is:

1. An integrated linear array of injection molded light-conductive pipes, each pipe comprising an input optical face and an output optical face connected by an elongated body of light-conductive material, where the pipes in the linear array are connected by integral alignment features projecting from the elongated bodies of the molded light-conductive pipes and are formed by:
   a.) forming a light pipe mold that includes multiple elongated cavities, each having two optical end faces, openings for injecting molten material into the cavities distant from either optical end face, and cavity contours that form at least one integral light pipe alignment feature projecting from the elongated bodies of the light pipes, wherein the openings for injecting molten material into the cavities are located in the alignment feature cavity contours;
   b.) providing molten material from a supply of molten material;
   c.) injecting the molten material through the openings; and
   d.) cooling and solidifying the molten material to form an array of light pipes connected by alignment features, each light pipe in the array having an input optical face and an output optical face connected by an elongated body of light-conductive material.

2. A method of manufacturing an integrated linear array of injection-molded light-conductive pipes of claim 1, comprising the steps of:
   a.) forming a light pipe mold that includes multiple elongated cavities, each having two optical end faces, openings for injecting molten material into the cavities distant from either optical end face, and cavity contours that form at least one integral light pipe alignment feature projecting from the elongated bodies of the light pipes, wherein the openings for injecting molten material into the cavities are located in the alignment feature cavity contours;
   b.) providing molten material from a supply of molten material;
   c.) injecting the molten material through the openings; and
   d.) cooling and solidifying the molten material to form an array of light pipes connected by alignment features, each light pipe in the array having an input optical face and an output optical face connected by an elongated body of light-conductive material.

3. The method of claim 2 wherein the light-pipe mold has a plurality of openings at a common location on each light pipe for injecting molten material from the supply.

4. The method of claim 2 wherein the array of light-pipes are arranged in a single row.

5. The method of claim 2 wherein the elongated cavity comprises an optically polished surface.

6. The method of claim 2 wherein the molten material is plastic.

7. The method of claim 6 wherein the plastic comprises one or more of the group including polycarbonates, acrylics, fluoropolymers, cyclic olefins, polysulfones, polyethersulfones, and polyetherimides.

8. The method of claim 6, wherein the molten material comprises an optical nanocomposite derivative of a plastic that has been modified with inorganic material.

9. The method of claim 2 further including the step of breaking off excess solidified material formed at a point where an opening joins a cavity from an elongated body.

10. The method of claim 2 wherein the alignment features are formed with a depression at the points where the openings join the cavities to prevent defects from interfering with the alignment features.

11. An optical faceplate comprising multiple stacked integrated linear arrays of injection molded light-conductive pipes according to claim 1.

12. A tiled flat-panel display system comprising a plurality of modules aligned in an array, each module comprising a flat-panel display having a plurality of pixels and an optical faceplate according to claim 11.

13. The array of light-conductive pipes of claim 1, wherein the light-conductive pipes are made of plastic.

14. The array of light-conductive pipes of claim 13, wherein the plastic comprises one or more of the group including polycarbonates, acrylics, fluoropolymers, cyclic olefins, polysulfones, polyethersulfones, and polyetherimides.

15. The array of light-conductive pipes of claim 1, wherein the light-conductive pipes are made of an optical nanocomposite derivative of a plastic that has been modified with inorganic material.

16. The array of light-conductive pipes of claim 15, wherein the light conductive pipes are made of an optical nanocomposite derivative of a transparent plastic that has been modified with inorganic materials to increase refractive index or lower chromatic dispersion.

* * * * *